(12) United States Patent
Murphy, Jr. et al.

(10) Patent No.: US 9,557,513 B1
(45) Date of Patent: Jan. 31, 2017

(54) OPTICAL SYSTEM FOR CORRECTING OPTICAL ABERRATIONS IN ELECTROMAGNETIC RADIATION

(71) Applicant: Lockheed Martin Corporation, Bethesda, MD (US)

(72) Inventors: Robert J. Murphy, Jr., Kissimmee, FL (US); Thomas E. Higgins, Jr., Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 27 days.

(21) Appl. No.: 14/455,414

(22) Filed: Aug. 8, 2014

(51) Int. Cl.
*G02B 7/02* (2006.01)
*G02B 7/00* (2006.01)
*B64C 1/14* (2006.01)
*B64D 43/00* (2006.01)

(52) U.S. Cl.
CPC ............. *G02B 7/003* (2013.01); *B64C 1/1484* (2013.01); *B64D 43/00* (2013.01); *G02B 7/023* (2013.01)

(58) Field of Classification Search
CPC ............. G02B 27/0018; G02B 27/0025; F41G 7/2213; F41G 7/2253; F41G 7/2293
USPC ........................................................ 359/811
See application file for complete search history.

(56) References Cited

U.S. PATENT DOCUMENTS

| 5,526,181 | A | 6/1996 | Kunick et al. |
| 5,914,821 | A | 6/1999 | Chen et al. |
| 6,129,307 | A | 10/2000 | Deoms et al. |
| 8,466,407 | B2 * | 6/2013 | Martin ............... G02B 27/0018 250/216 |

FOREIGN PATENT DOCUMENTS

| EP | 0616187 A1 | 3/1994 |
| EP | 0660152 B1 | 12/1994 |
| EP | 0848273 A2 | 3/1997 |
| WO | 8703681 A1 | 6/1987 |
| WO | 0157558 A2 | 8/2001 |

OTHER PUBLICATIONS

Hopkins, Robert E. et al., "Military Standardization Handbook—Optical Design (MIL-HDBK-141)," Oct. 5, 1962, Defense Supply Agency, 714 pages.

* cited by examiner

*Primary Examiner* — Euncha Cherry
(74) *Attorney, Agent, or Firm* — Withrow & Terranova, PLLC

(57) ABSTRACT

An optical system is provided. The optical system includes a corrector lens that is configured to reduce aberrations in electromagnetic radiation (EMR) received from a window having a window axis of symmetry. A rotation mechanism is coupled to the corrector lens, and is configured to selectively rotate the corrector lens about an optical axis of the corrector lens to maintain a Y-axis of the corrector lens in a same plane as the window axis of symmetry of the window.

17 Claims, 10 Drawing Sheets

OPTICAL SYSTEM FOR CORRECTING OPTICAL ABERRATIONS IN ELECTROMAGNETIC RADIATION

TECHNICAL FIELD

The embodiments relate generally to analyzing or otherwise processing environmental electromagnetic radiation (EMR) and, in particular, to reducing optical aberrations in the EMR that result from passing through a window.

BACKGROUND

It is often desirable to detect and analyze electromagnetic radiation (EMR) originating from an environment in order to gain knowledge about the environment. In the context of a vehicle, such as an aircraft, EMR may be received through a window of the vehicle, analyzed or otherwise processed, and the results of such analysis used to provide operational personnel with useful information regarding the environment outside the vehicle. In a commercial aviation context, such information may include the identification of potential landing sites, topography information, nearby aircraft, geographic landmarks, and the like. In a military aviation context such information may include the above, as well as identification of potential targets, identification of potential adversaries, and the like. At least in a military context, such sensing mechanisms typically have an ability to scan a field of view across in azimuth, and/or vertically in elevation, within a field-of-regard of the system. The sensing mechanisms typically involve a receive lens arrangement that focuses the energy, in the form of EMR in a desired wavelength, or band of wavelengths, to a sensor. The sensor quantifies the EMR received, and facilitates the generation of imagery of the environment.

It is known that a window that has a non-spherical shape introduces aberrations in EMR as the EMR passes through the window. In order to reduce or adjust for the aberrations, it is often necessary to position relatively complex and expensive lens arrangements between the window and the sensor to reduce the aberrations. Alternatively, windows are often designed to have spherical shapes. Unfortunately, a spherical shape is not an efficient aerodynamic shape, and can negatively impact speed, range, and other characteristics of the vehicle. Accordingly, in many applications, it would be desirable if a conformal, non-spherical window could be utilized without the need for relatively expensive and complex lens arrangements that are designed to reduce or correct the aberrated EMR.

SUMMARY

The embodiments relate to optical systems, and related methods, that provide a corrector lens that reduces aberrations in electromagnetic radiation (EMR) that are caused by a window through which the EMR passes on a path to a sensor. Generally, the corrector lens is configured to substantially reduce the aberrations prior to the EMR impinging upon the sensor. The window is a section of a shape that has an axis of symmetry, such as, by way of non-limiting example, a cone, an ellipse, a hyperbola, a parabola, and the like. The corrector lens is selectively rotated about the optical axis of the corrector lens to maintain a Y-axis of the corrector lens in a same plane as the window axis of symmetry of the window. The embodiments provide a relatively small, low-cost, and single lens mechanism for reducing aberrations caused by conformal windows.

In one embodiment, an optical system is provided. The optical system includes a corrector lens that is configured to reduce aberrations in EMR received from a window having a window axis of symmetry. A rotation mechanism is coupled to the corrector lens, and is configured to selectively rotate the corrector lens about the optical axis of the corrector lens to maintain a Y-axis of the corrector lens in a same plane as the window axis of symmetry of the window.

In one embodiment, the rotation mechanism is further configured to rotate the corrector lens about the optical axis of the corrector lens based on a window location associated with a line-of-sight (LOS) of the optical system.

In one embodiment, the rotation mechanism is further configured to rotate the corrector lens to a first angular position when the LOS intersects the window at a first window location, and to a second angular position when the LOS intersects the window at a second window location.

In one embodiment, the window is a section of a cone. In another embodiment, the window is a section of an ellipsoid.

In one embodiment, the optical system includes a gimbal, and the rotation mechanism is coupled to the gimbal.

In one embodiment, the corrector lens comprises a corrective element, and the corrector lens is the only corrective element in the optical system.

In one embodiment, the corrector lens is positioned at the pupil plane of the optical system.

In one embodiment, the optical system has a LOS that is movable in azimuth and in elevation. The rotation mechanism is configured to rotate the corrector lens about the optical axis of the corrector lens to maintain the Y-axis in the same plane as the window axis of symmetry when the LOS scans in azimuth, and wherein the Y-axis of the corrector lens is maintained in the same plane as the window axis of symmetry without rotation when the LOS scans in elevation.

In some embodiments, the corrector lens corrects for astigmatism along an axis that is normal to the window axis of symmetry, and corrects for trefoil along an axis that is parallel to the window axis of symmetry.

In one embodiment, the optical system includes a gimbal. The gimbal includes a sensor that is configured to output gimbal orientation information that identifies a current orientation of the gimbal. The rotation mechanism includes a controller that is communicatively coupled to the gimbal. The controller is configured to receive the gimbal orientation information and, based on the gimbal orientation information, determine a planar orientation of the Y-axis of the corrector lens necessary to maintain the Y-axis of the corrector lens in the same plane as the window axis of symmetry. The controller is further configured to cause the rotation mechanism to rotate the corrector lens to the planar orientation.

In another embodiment, an aircraft is provided. The aircraft includes an airframe that has a non-spherical aerodynamic surface, and a conformal window that conforms to the non-spherical aerodynamic surface. The aircraft also includes an optical system that is positioned within the airframe and that is configured to receive EMR through the conformal window. The optical system includes a corrector lens that is configured to reduce aberrations in the EMR received through the window. The window has a window axis of symmetry, and the corrector lens has a Y-axis. The optical system also includes a rotation mechanism that is coupled to the corrector lens, the rotation mechanism being configured to selectively rotate the corrector lens about the optical axis of the corrector lens to maintain the Y-axis of the corrector lens in a same plane as the window axis of symmetry.

In another embodiment, a method is provided. The method includes rotating, by a rotation mechanism coupled to a corrector lens having a Y-axis and being configured to reduce aberrations in EMR received from a window having a window axis of symmetry, the corrector lens about the optical axis of the corrector lens to maintain the Y-axis of the corrector lens in a same plane as the window axis of symmetry. The method further includes receiving, by the corrector lens, EMR comprising aberrations. The corrector lens transmits corrected EMR in a downstream direction of an optical path toward a sensor.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first algorithm" and "second algorithm," and does not imply a priority, a type, an importance, or other attribute, unless otherwise stated herein. The term "about" used herein in conjunction with a numeric value means any value that is within a range of ten percent greater than or ten percent less than the numeric value.

Figure 1:
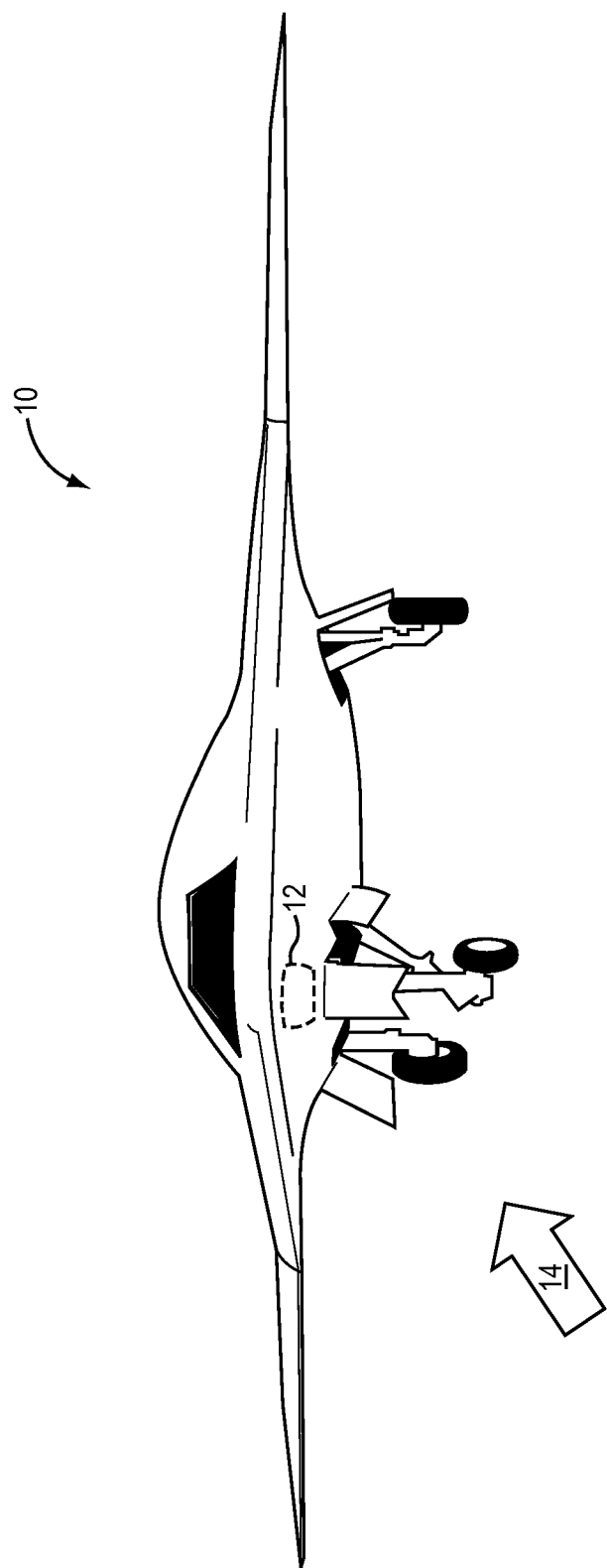
FIG. 1 is a diagram of a vehicle with a conformal window according to one embodiment.

FIG. 1 is a diagram of a vehicle 10 with a conformal window 12 according to one embodiment. The term "conformal" refers to a non-spherical window that conforms to an exterior section of a vehicle frame, such as, in this example, the airframe of the vehicle 10. The window 12 is aerodynamic because the shape of the window 12 conforms with the rest of the non-spherical aerodynamic surface of the airframe. While for purposes of illustration, the vehicle 10 is a fixed-wing aircraft, the embodiments are not limited to conformal windows on fixed-wing aircraft, such as an airplane or unmanned aerial vehicle, and can be utilized in any context in which a conformal window is beneficial, such as helicopters, ground vehicles, submersible vehicles, and the like.

Because the window 12 has a non-spherical shape, the window 12 causes aberrations in electromagnetic radiation (EMR) 14 from an environment. The EMR 14 passes through the window 12 on a path to a sensor maintained behind the window 12 (not illustrated). The aberrations may be quantified, in terms of Zernike equations, such as astigmatism, trefoil, and the like. The embodiments relate to optical systems, and related methods, that provide a corrector lens that reduces the aberrations in the EMR 14 that are caused by the window 12 through which the EMR 14 passes on a path to the sensor. Generally, the corrector lens is configured to substantially reduce the aberrations prior to the EMR 14 impinging upon the sensor. As will be explained in greater detail below, the window 12 is a section of a shape that has an axis of symmetry, such as, by way of non-limiting example, a cone, an ellipse, a hyperbola, a parabola, and the like. The corrector lens is selectively rotated about an optical axis of the corrector lens to maintain the Y-axis of the corrector lens in a same plane as the window axis of symmetry of the window 12. The embodiments provide a relatively small, low-cost, and single lens mechanism for reducing aberrations caused by conformal windows.

Figure 2A:
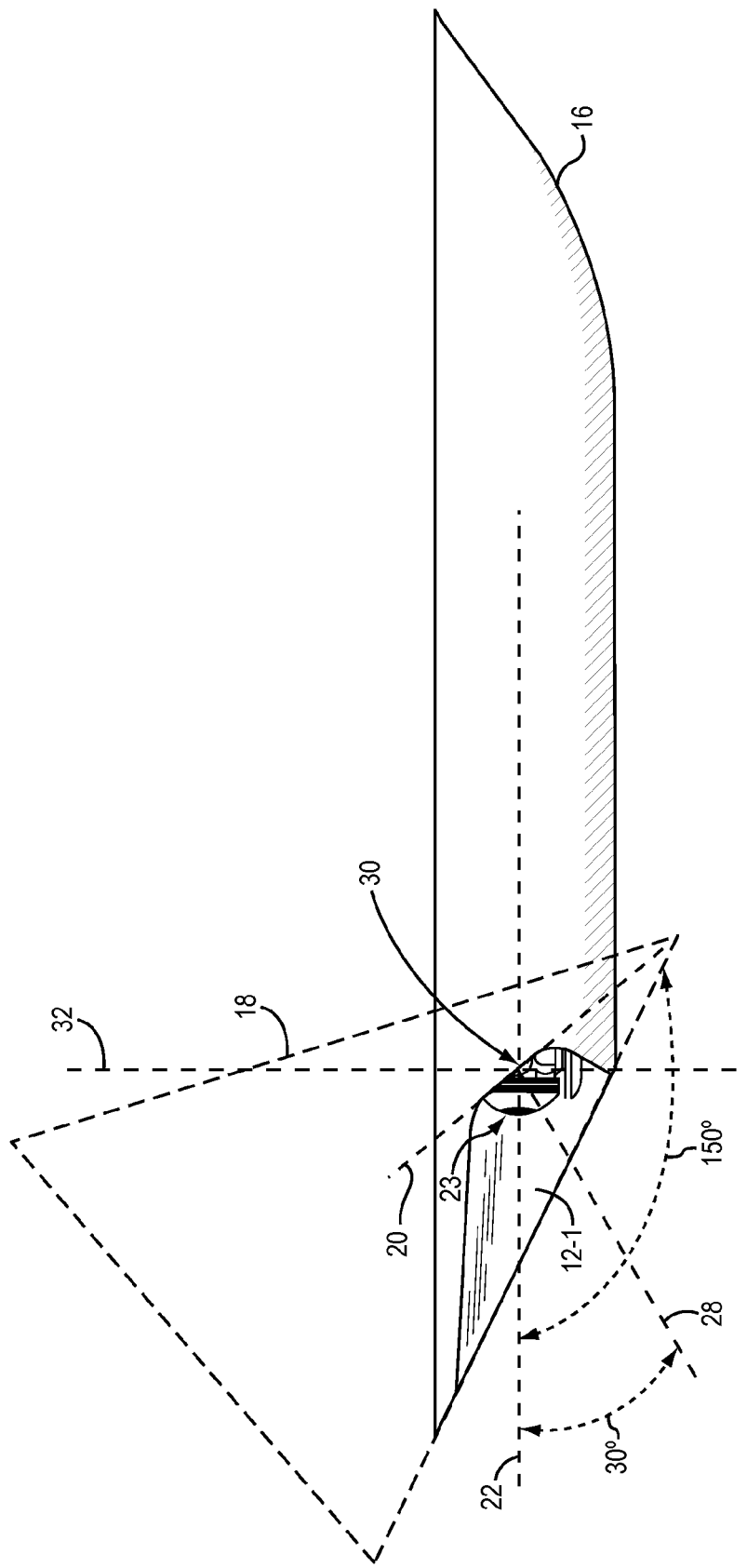
FIG. 2A is a side view of a portion of an airframe integrated with a conformal window according to one embodiment.

Prior to delving into the details of the corrector lens and operation thereof, a discussion regarding windows suitable for use with the embodiments and regarding mechanisms for designing a suitable corrector lens will be presented. In this regard, FIG. 2A is a side view of a portion 16 of an airframe integrated with a conformal window 12-1 according to one embodiment. The portion 16 of the airframe might comprise, for example, a pod under a wing of an aircraft, the wing itself, or under a fuselage. The conformal window 12-1 is a section of a symmetrical shape, in this example a cone 18. The cone 18 includes an axis of symmetry, which will be referred to herein as a window axis of symmetry 20. The conformal window 12-1 is symmetric about the window axis of symmetry 20.

The cone 18 is rotated approximately 150 degrees with respect to a zero horizontal forward axis 22 of the vehicle. An optical system 23 is positioned behind the window 12-1. The optical system 23 may comprise a number of elements or components, such as a corrector lens (not illustrated), a gimbal, a controller, and a sensor. The optical system 23 has a line-of-sight (LOS) that determines from where in the environment the optical system 23 is receiving EMR, as well as which portion of the window 12-1 the EMR is passing through on a path to the sensor. The LOS illustrated in FIG. 2A is along the zero horizontal forward axis 22, in other words, straight ahead, but the LOS can change in elevation and/or in azimuth as desired. The LOS may be altered via the gimbal, which may comprise a 2- or 3-axis gimbal capable of moving the LOS in any desired direction, or at least in elevation and azimuth, as desired.

Figure 2B:
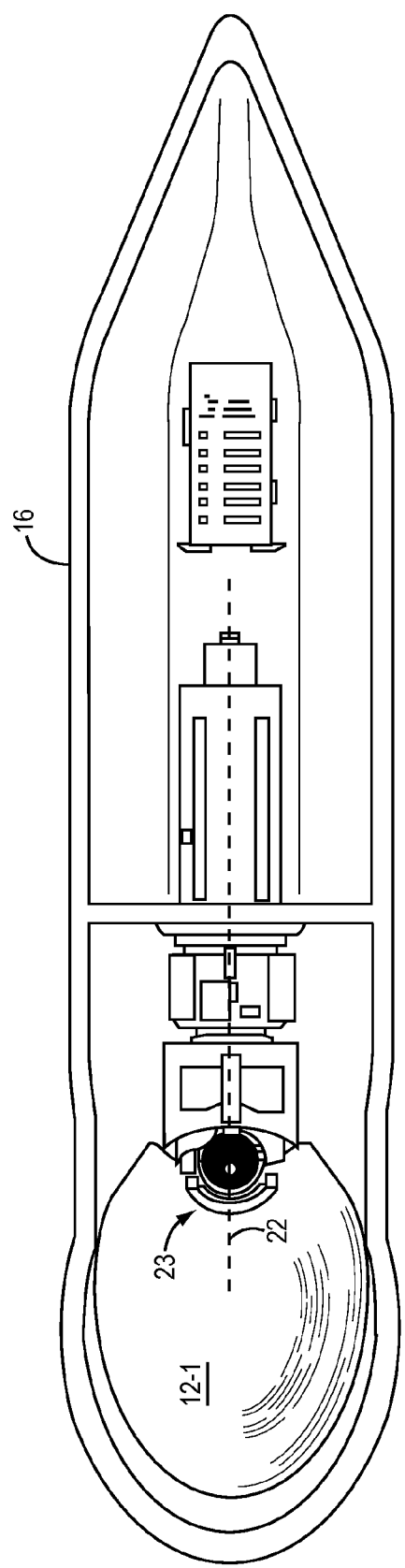
FIG. 2B is a plan view of the portion of the airframe illustrated in FIG. 2A.

FIG. 2B is a plan view of the portion 16 of the airframe illustrated in FIG. 2A.

Figure 3A:
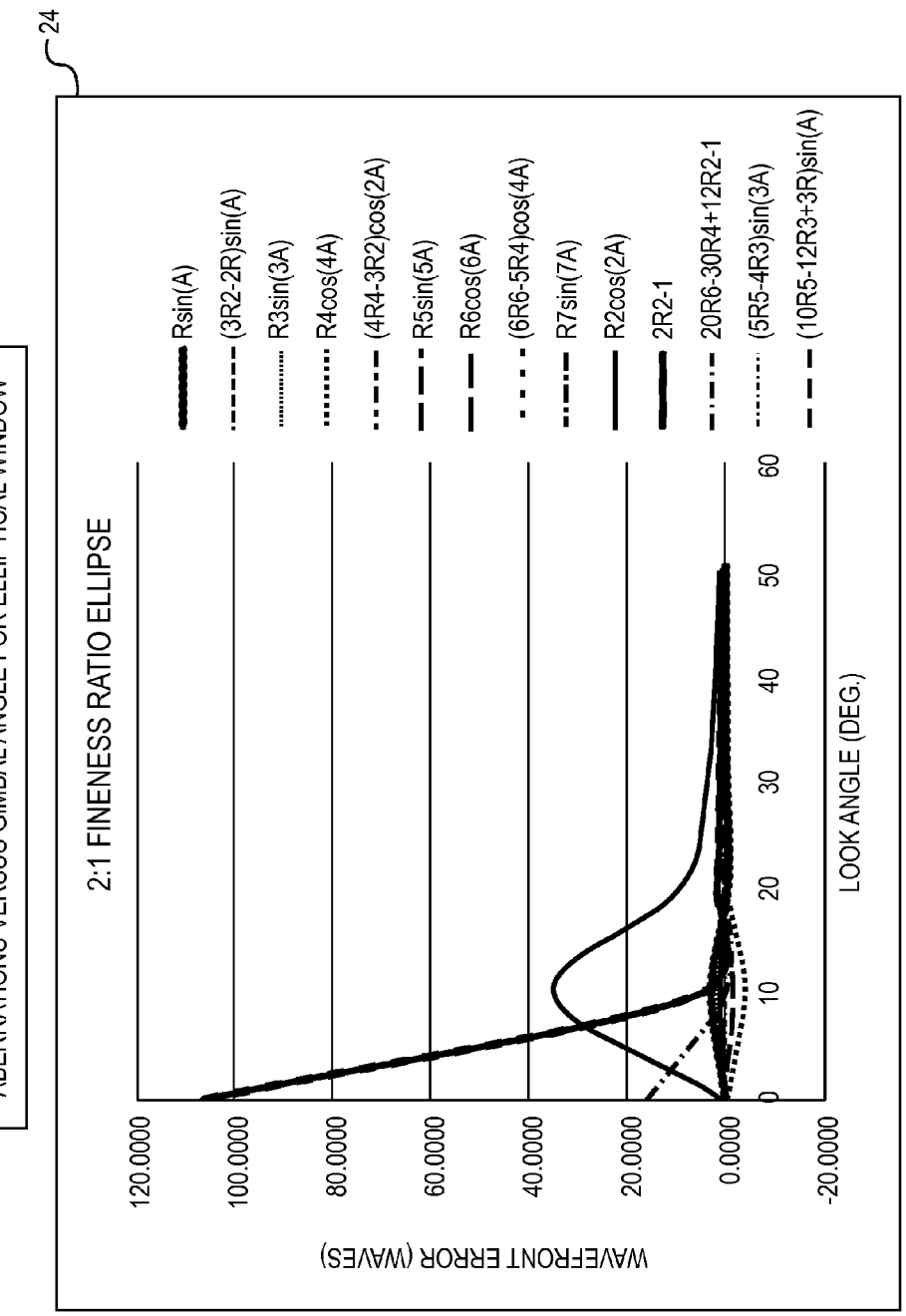
FIG. 3A is a graph illustrating aberrations versus gimbal angle for an elliptical-shaped window according to one embodiment.
Figure 3B:
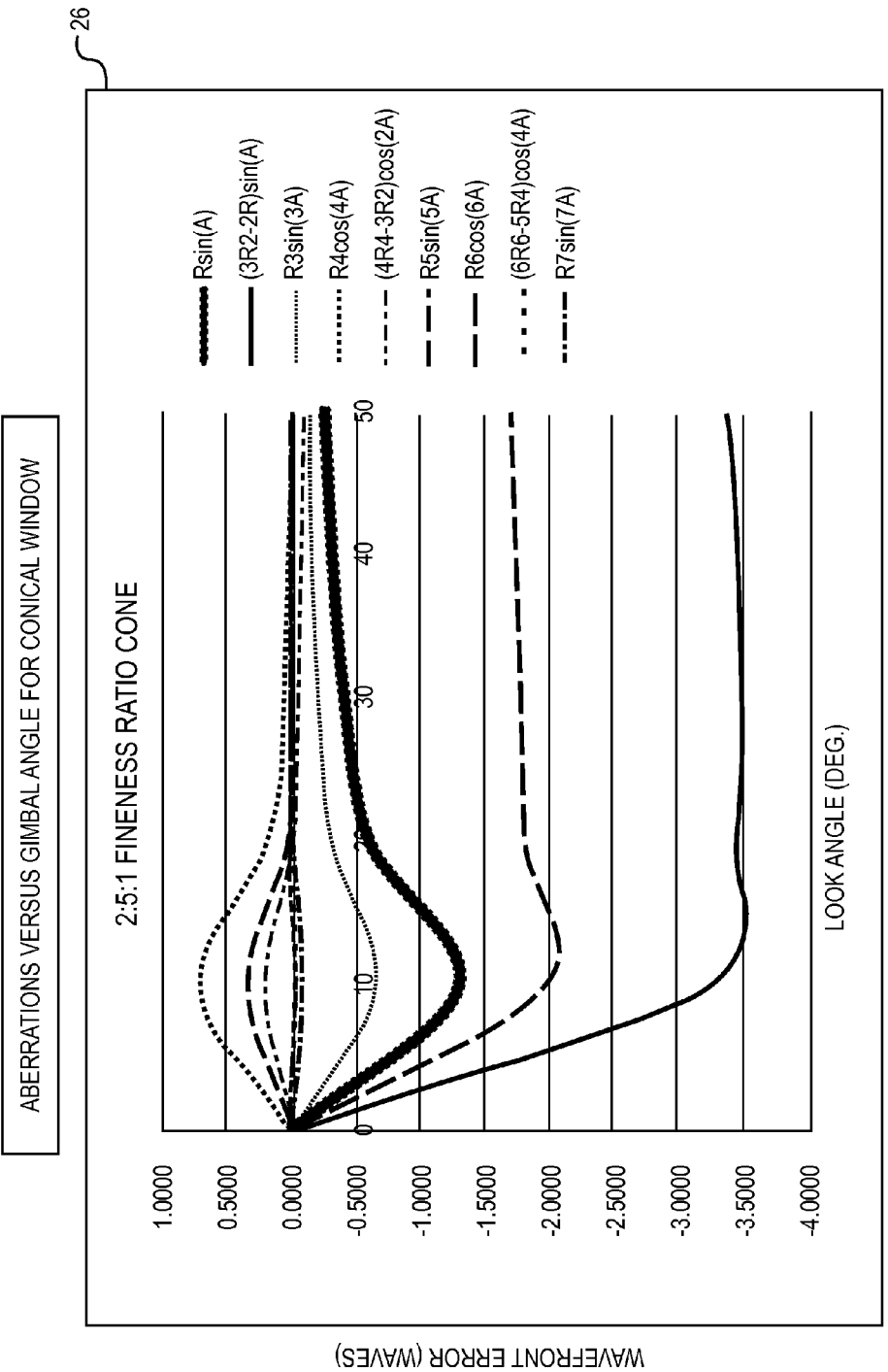
FIG. 3B is a graph illustrating aberrations versus gimbal angle for a cone-shaped window according to one embodiment.

Referring briefly to FIGS. 3A and 3B, past attempts at conformal window designs conventionally attempt to center a field-of-regard (FOR) of the respective optical system about an axis of symmetry of the conformal window. FIG. 3A is a graph 24 illustrating aberrations versus gimbal angle for an elliptical-shaped window. As can be seen in the plot, the aberrations defined by Zernike coefficients are very large for gimbal angles from zero to 25 degrees, and then the aberrations begin to flatten out after about 25-30 degrees. FIG. 3B is a graph 26 illustrating aberrations versus gimbal angle for a cone-shaped window, which illustrates a similar behavior. The aberration behaviors illustrated in FIGS. 3A-3B are typical for windows defined using conic sections, such as hyperbolas, parabolas, and ellipses.

It may be desirable to align an FOR of a system with respect to an axis of symmetry of a window where the aberrations change by the least amount. The magnitude of the aberrations are less important than the amount of change in aberrations. Referring back to FIG. 2A, note that the window axis of symmetry 20 is rotated backward about 150 degrees from the zero horizontal forward axis 22 of the vehicle. The LOS of the optical system 23 along the zero horizontal forward axis 22 and an LOS 28 represent respectively a zero elevation LOS looking straight ahead, and a −30 degree LOS looking down relative to the coordinate system of the vehicle 10. The Zernike coefficients that describe the Root-Mean-Square (RMS) wavefront errors for these two lines-of-sight through the conical window 12-1 are listed below in Table 1.

TABLE 1

| Line-Of-Sight At Zero Degrees Relative To Aircraft, 150 Degrees Relative To Window Axis Of Rotation FRINGE ZERNIKE POLYNOMIAL COEFFICIENTS (Normalization Radius = 2.500000) | | | Line-Of-Sight At −30 Degrees Relative To Aircraft, 120 Degrees Relative To Window Axis Of Rotation FRINGE ZERNIKE POLYNOMIAL COEFFICIENTS (Normalization Radius = 2.500000) | | |
|---|---|---|---|---|---|
| Number | Coefficient | RMS Wavefront Error | Number | Coefficient | RMS Wavefront Error |
| 1 | −0.6804 | 0.6804 | 1 | −0.8572 | 0.8572 |
| 2 | 0.0000 | 0.0000 | 2 | 0.0000 | 0.0000 |
| 3 | −0.1615 | 0.0807 | 3 | −0.1780 | 0.0890 |
| 4 | −0.6929 | 0.4001 | 4 | −0.8725 | 0.5037 |
| 5 | −1.3508 | 0.5515 | 5 | −1.7167 | 0.7008 |
| 6 | 0.0000 | 0.0000 | 6 | 0.0000 | 0.0000 |
| 7 | 0.0000 | 0.0000 | 7 | 0.0000 | 0.0000 |
| 8 | −0.0837 | 0.0296 | 8 | −0.0916 | 0.0324 |
| 9 | −0.0127 | 0.0057 | 9 | −0.0156 | 0.0070 |
| 10 | 0.0000 | 0.0000 | 10 | 0.0000 | 0.0000 |
| 11 | −0.2437 | 0.0862 | 11 | −0.2708 | 0.0957 |
| 12 | −0.0131 | 0.0041 | 12 | −0.0213 | 0.0067 |
| 13 | 0.0000 | 0.0000 | 13 | 0.0000 | 0.0000 |
| 14 | 0.0000 | 0.0000 | 14 | 0.0000 | 0.0000 |
| 15 | −0.0020 | 0.0006 | 15 | −0.0018 | 0.0005 |
| 16 | −0.0003 | 0.0001 | 16 | −0.0003 | 0.0001 |
| 17 | 0.0224 | 0.0071 | 17 | 0.0076 | 0.0024 |
| 18 | 0.0000 | 0.0000 | 18 | 0.0000 | 0.0000 |
| 19 | 0.0000 | 0.0000 | 19 | 0.0000 | 0.0000 |
| 20 | −0.0041 | 0.0012 | 20 | −0.0043 | 0.0012 |
| 21 | −0.0003 | 0.0001 | 21 | −0.0004 | 0.0001 |
| 22 | 0.0000 | 0.0000 | 22 | 0.0000 | 0.0000 |
| 23 | 0.0000 | 0.0000 | 23 | 0.0000 | 0.0000 |
| 24 | −0.0001 | 0.0000 | 24 | 0.0000 | 0.0000 |
| 25 | 0.0000 | 0.0000 | 25 | 0.0000 | 0.0000 |
| 26 | 0.0000 | 0.0000 | 26 | 0.0000 | 0.0000 |
| 27 | −0.0005 | 0.0001 | 27 | −0.0036 | 0.0010 |
| 28 | 0.0005 | 0.0001 | 28 | 0.0001 | 0.0000 |
| 29 | 0.0000 | 0.0000 | 29 | 0.0000 | 0.0000 |
| 30 | 0.0000 | 0.0000 | 30 | 0.0000 | 0.0000 |
| 31 | −0.0001 | 0.0000 | 31 | −0.0001 | 0.0000 |
| 32 | 0.0000 | 0.0000 | 32 | 0.0000 | 0.0000 |
| 33 | 0.0000 | 0.0000 | 33 | 0.0000 | 0.0000 |
| 34 | 0.0000 | 0.0000 | 34 | 0.0000 | 0.0000 |
| 35 | 0.0000 | 0.0000 | 35 | 0.0000 | 0.0000 |
| 36 | 0.0000 | 0.0000 | 36 | 0.0000 | 0.0000 |

Aberration Variation with Elevation Angle

The aberrations caused by a window may be determined in any suitable manner. In one embodiment, an interferometer may be utilized. In Table 1, the first term Zernike coefficient is piston error, which has substantially no effect on performance. The second and third RMS wavefront errors are tilt in the X-axis and tilt in the Y-axis. These RMS wavefront errors only represent a pointing error and have substantially no impact on system optical resolution. Table 1 illustrates that with respect to the remaining aberrations, the most significant RMS wavefront errors are represented in the fifth term (astigmatism in the X direction) and the eleventh term (Trefoil in the Y direction) Zernike coefficients. The amplitude of the fifth term Zernike coefficient varies from −1.3508 waves to −1.7167 waves over the range of the 30 degrees in elevation FOR. Similarly, the amplitude of the eleventh term Zernike coefficient varies from −0.2437 waves to −0.2708 waves. Therefore, if the corrector lens is designed to have a fifth term Zernike coefficient of +1.534 waves, then the composite aberration of the window 12-1 and corrector lens will vary over the range of elevation angles from +0.183 waves to −0.183 waves. Similarly, by designing the corrector lens to add an amount of eleventh term Zernike coefficient of +0.2575 waves, the composite correction of the window 12-1 and corrector lens will vary from +0.01355 to −0.01355 waves. This amount of composite RMS wavefront error provides an optical system with very little image degradation due to the window 12-1 over the elevation FOR. Furthermore, the corrector lens surface can be defined using the same fifth and eleventh term polynomials needed to be corrected.

Conic sections, such as hyperbolas, parabolas, and ellipses may be defined using equation (1) below. A cone may be considered a special case of a hyperbola. Equation (1) may be used to define the aspheric conic surfaces that comprise the inner and outer surfaces of the window 12-1. The A, B, C, D, E, F, G, and H terms describe perturbations of the conic surface that may be used to slightly change the conic surface to improve optical aberration correction without physically altering the basic shape of the window.

The general form of an aspheric conic surface is as follows:

$$\text{Aspheric surface sag } z = cy^2/(1+(1-(k+1)c^2y^2)^{-1/2})) + Ay^4 + By^6 + Cy^8 + Dy^{10} + Ey^{12} + Fy^{14} + Gy^{16} + Hy^{20} \quad (1)$$

wherein:
z=the sag of the surface parallel to the z-axis;
c=the curvature at the pole of the surface (CUY);
k=the conic constant (K), and wherein:
  k=0 is a sphere;
  −1<k<0 is an ellipsoid with major axis on the optical axis (prolate spheroid);
  k=−1 is a paraboloid;
  k<−1 is a hyperboloid;
  Also, k=−$e^2$, where e is eccentricity
  k>0 is an oblate spheroid (not a conic section) wherein the surface is generated by rotating an ellipse about its minor axis and $$k = e^2/(1-e^2)$$

where e is the eccentricity of the generating ellipse;
A, B, C, D, E, F, G, H, J=the 4th, 6th, 8th, 10th, 12th, 14th, 16th, 18th, 20th order deformation coefficients, respectively (A=B=C=D=E=F=G=H=J=0 yields a pure conic surface); and
y=the radial distance of the lens from the optical axis of the surface.

Aspheric surfaces can also be defined using the same Zernike polynomials that are used to analyze the wavefront error caused by the window 12-1. One technique used is to analyze the wavefront error over the greatest range of incidence angles that the LOS may have in view of possible gimbal angles. In the example illustrated herein, over the range of gimbal angles from 0 to −30 degrees in elevation, the fifth Zernike term, Astigmatism in X, changes from −1.3508 to −1.7167 waves and the eleventh Zernike term, Trefoil in Y, varies from −0.2437 to −0.2708 waves. These terms are the amplitudes for their respective polynomials of $r^2 \cos(2\theta)$ and $r^3 \sin(3\theta)$ where r and $\theta$ are the polar coordinates defining the points inside a circular aperture. The Zernike coefficients together with the Zernike polynomials describe the wavefront error due to the EMR transmitting through the window 12-1 for the given LOS angles. To compensate for the wavefront error, the corrector lens is designed to have a compensating wavefront error that is opposite in sign to the average value of each pair of minimum and maximum Zernike coefficients. This may be accomplished by defining a surface deformation in the corrector lens using the same Zernike polynomials that define the wavefront error of the window 12-1. Mathematically this may be written as:

$$\text{Surface deformation for the corrector lens} = (n-1)\Sigma_{i=4} (-1)(Z_{i,max} + Z_{i,Min})/2$$

wherein: i=Zernike Term Number;
n=corrector lens refractive index;
$Z_{i,max}$=The maximum value of the ith Zernike coefficient multiplied by the ith Zernike polynomial; and
$Z_{i,Min}$=The minimum value of the ith Zernike coefficient multiplied by the ith Zernike polynomial.

This technique provides substantial advantages in fabrication and metrology of the components of the conformal window system comprising the window 12-1 and corrector lens. One advantage to defining the desired surface deformation using Zernike polynomials is that modern diamond turning fabrication equipment using fast tool servo and slow tool servo technology are able to machine the desired surface deformation into the surface of the corrector lens. In addition, the desired Zernike polynomial correction may be split between adjacent surfaces of the corrector lens, or between multiple elements of a corrector lens such that each surface contains a deformation defined by one or more Zernike polynomials. A goal in defining the corrector lens is to produce the opposite amount of wavefront error in the EMR as will be introduced by the window 12-1. Defining the surface deformation using Zernike polynomials in the corrector lens will produce wavefront error that will be opposite in sign to the window 12-1 and will be defined by the same Zernike polynomials as the wavefront error that is due to the window 12-1. Another advantage of this technique is that interferometer software can analyze and output the measured wavefront error in terms of Zernike polynomials. Therefore, when the corrector lens is manufactured correctly, measurement by an interferometer at the appropriate wavelength or band of wavelengths will produce wavefront error coefficients for the desired Zernike coefficients that are equal to and opposite of the expected wavefront error due to the window 12-1.

Thus, after the corrector lens is manufactured correctly, the corrector lens can then be used as a null lens for testing the fabricated window 12-1 such that when the window 12-1 is fabricated correctly, the combined window 12-1 and corrector lens will compensate and have a minimal amount of total wavefront error. This ability to measure the fabricated quality of the components represents a substantial advantage.

In one embodiment, the corrector lens pivots about a gimbal center location 30 that lies on the window axis of symmetry 20 of the window 12-1. In one embodiment, the corrector lens (not illustrated) remains perpendicular to the current LOS as the LOS pivots in elevation about the gimbal center location 30. Because the window axis of symmetry 20 is tilted forward, the window axis of symmetry 20 remains in the same plane as a Y-axis of the corrector lens, as illustrated in greater detail below. Thus, a projection of the window axis of symmetry 20 on the Y-axis of the corrector lens remains parallel.

If the LOS of the system is moved in azimuth, rather than in elevation, as the LOS moves in azimuth about a vertical axis 32, the projection of the window axis of symmetry 20 relative to the Y-axis of the corrector lens rotates about the center of the corrector lens.

Table 2 illustrates Zernike coefficients for the window 12-1 as the azimuth angle changes from zero to 60 degrees in increments of 30 degrees, according to one embodiment.

TABLE 2

| Number | Zernike Coefficients at 0 Degrees Azimuth | Zernike Coefficients at 30 Degrees Azimuth | Zernike Coefficients at 60 Degrees Azimuth |
| --- | --- | --- | --- |
| 1 | −0.6804 | −0.5513 | −0.4039 |
| 2 | 0 | −0.0198 | 0.0268 |
| 3 | −0.1615 | −0.1342 | −0.1587 |
| 4 | −0.6929 | −0.5604 | −0.4102 |
| 5 | −1.3508 | −0.6721 | 0.308 |
| 6 | 0 | 0.8642 | 0.751 |
| 7 | 0 | −0.01 | 0.0139 |
| 8 | −0.0837 | −0.0693 | −0.0816 |
| 9 | −0.0127 | −0.0093 | −0.0064 |
| 10 | 0 | −0.1863 | −0.095 |
| 11 | −0.2437 | −0.0612 | 0.0834 |

TABLE 2-continued

| Number | Zernike Coefficients at 0 Degrees Azimuth | Zernike Coefficients at 30 Degrees Azimuth | Zernike Coefficients at 60 Degrees Azimuth |
| --- | --- | --- | --- |
| 12 | −0.0131 | −0.0036 | 0.0097 |
| 13 | 0 | 0.0093 | 0.0067 |
| 14 | 0 | −0.0001 | 0.0003 |
| 15 | −0.002 | −0.0015 | −0.0015 |
| 16 | −0.0003 | −0.0002 | −0.0001 |
| 17 | 0.0224 | 0.0015 | −0.0083 |
| 18 | 0 | −0.0176 | −0.0102 |
| 19 | 0 | −0.0027 | −0.0012 |
| 20 | −0.0041 | −0.0007 | 0.0013 |
| 21 | −0.0003 | 0 | 0.0002 |
| 22 | 0 | 0.0002 | 0.0001 |
| 23 | 0 | 0 | 0 |
| 24 | −0.0001 | 0 | 0 |
| 25 | 0 | 0 | 0 |
| 26 | 0 | 0.0002 | 0.0016 |
| 27 | −0.0005 | 0.0007 | −0.0006 |
| 28 | 0.0005 | 0 | −0.0001 |
| 29 | 0 | −0.0003 | −0.0002 |
| 30 | 0 | −0.0001 | 0 |
| 31 | −0.0001 | 0 | 0 |
| 32 | 0 | 0 | 0 |
| 33 | 0 | 0 | 0 |
| 34 | 0 | 0 | 0 |
| 35 | 0 | 0 | 0 |
| 36 | 0 | 0 | 0 |

(Variation in Window 12-1 Optical Aberrations as a Function of Azimuth Angle without Rotation of the Corrector Lens)

As illustrated, as the azimuth angle changes from 0 to 60 degrees in increments of 30 degrees without rotation of the corrector lens, the Zernike coefficients become relatively large and the sixth term (astigmatism in the Y direction) and the tenth term (Trefoil in X) Zernike coefficients begin to contribute to the optical aberrations. This is because as the azimuth LOS angle changes, the projection of the window axis of symmetry 20 angle rotates relative to the X- and Y-axes of the corrector lens. If the corrector lens is rotated to maintain an alignment of the Y-axis of the corrector lens with the projection of the window axis of symmetry 20, i.e., if the corrector lens is rotated to maintain the Y-axis in the same plane as the window axis of symmetry 20, then the Zernike coefficients will reduce, as illustrated in Table 3, below.

TABLE 3

| Number | Zernike Coefficients at 0 Degrees Azimuth | Zernike Coefficients at 30 Degrees Azimuth | Zernike Coefficients at 60 Degrees Azimuth |
| --- | --- | --- | --- |
| 1 | 0.078 | 0.0438 | −0.0088 |
| 2 | 0 | 0.0019 | 0.0029 |
| 3 | 0.0212 | 0.011 | −0.002 |
| 4 | 0.0751 | 0.0408 | −0.0121 |
| 5 | 0.1567 | 0.0648 | −0.0095 |
| 6 | 0 | −0.0528 | 0.0332 |
| 7 | 0 | 0.0008 | 0.0019 |
| 8 | 0.0077 | 0.0034 | −0.0032 |
| 9 | −0.003 | −0.003 | −0.0034 |
| 10 | 0 | 0.0142 | −0.0062 |
| 11 | 0.031 | 0.0087 | −0.0019 |
| 12 | 0.0014 | 0.001 | 0.0066 |
| 13 | 0 | 0.0025 | 0.0032 |
| 14 | 0 | −0.0001 | 0.0003 |
| 15 | −0.002 | −0.0015 | −0.0015 |
| 16 | −0.0001 | −0.0001 | −0.0001 |
| 17 | 0.0378 | −0.0002 | −0.0102 |
| 18 | 0 | −0.0269 | −0.0075 |
| 19 | 0 | −0.0026 | −0.0011 |
| 20 | −0.004 | −0.0007 | 0.0013 |
| 21 | 0.0001 | 0.0001 | 0.0002 |
| 22 | 0 | 0 | 0 |
| 23 | 0 | 0 | 0 |
| 24 | 0 | 0 | 0 |
| 25 | 0 | 0 | 0 |
| 26 | 0 | 0.0002 | 0.0015 |
| 27 | −0.0005 | 0.0007 | −0.0006 |
| 28 | 0.0008 | 0 | −0.0002 |
| 29 | 0 | −0.0005 | −0.0001 |
| 30 | 0 | 0 | 0 |
| 31 | −0.0001 | 0 | 0 |
| 32 | 0 | 0 | 0 |
| 33 | 0 | 0 | 0 |
| 34 | 0 | 0 | 0 |
| 35 | 0 | 0 | 0 |
| 36 | 0 | 0 | 0 |

(Zernike Coefficients with Corrector Lens Rotated to Stay in Plane of Window Axis of Symmetry 20)

In particular, if the corrector lens is rotated by 22.5 degrees and 37.2 degrees for azimuth angles of 30 degrees and 60 degrees, respectively, the resulting aberrations are listed in Table 3. As can be seen in Table 3, the aberrations are sufficiently corrected, or reduced, to provide relatively good image quality. With tilt removed, the maximum values composite RMS wavefront error results for the system are 0.08 waves RMS for 0 degrees azimuth and 0 degrees elevation, 0.10 waves RMS for zero degrees azimuth and −30 degrees elevation, 0.043 waves RMS for 30 degrees azimuth and 0 degrees elevation, and 0.017 waves RMS for 60 degrees azimuth and 0 degrees elevation. Those skilled in the art will recognize that these RMS wavefront error values represent well-corrected wavefront error.

Figure 4:
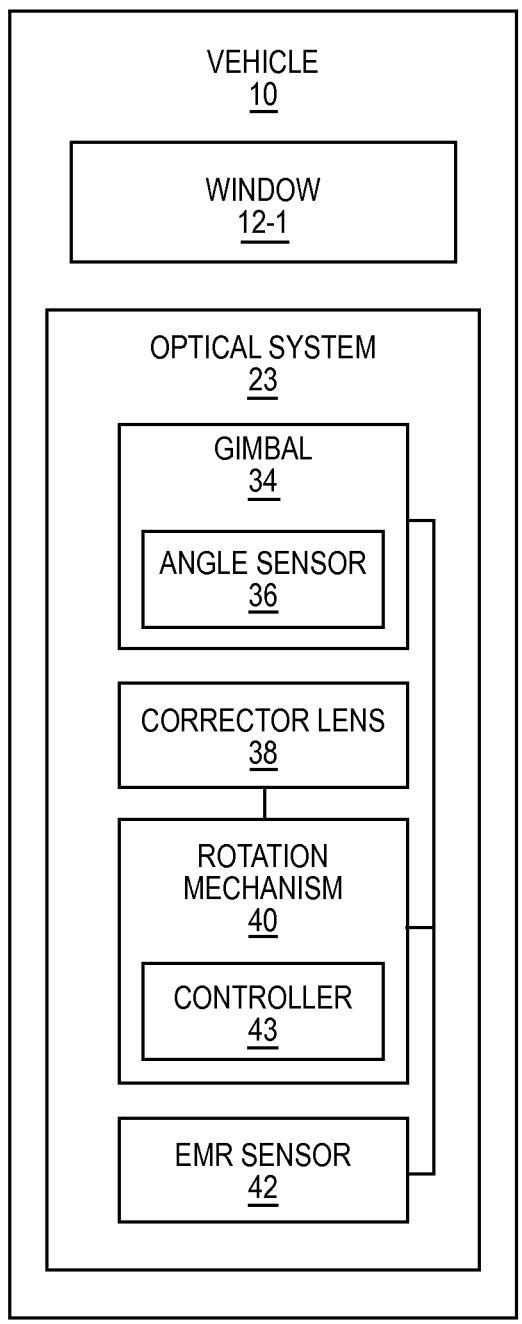
FIG. 4 is a block diagram of the vehicle illustrated in FIG. 1 according to one embodiment.

FIG. 4 is a block diagram of the vehicle 10 illustrated in FIG. 1 according to one embodiment. The vehicle 10 includes the window 12-1 that has a window axis of symmetry. The optical system 23 includes a gimbal 34 that is configured to selectively change the LOS of the optical system 23 over time. The gimbal 34 may respond to user inputs, such as from an operator in the vehicle 10, and/or automatically, based on a programmed movement of the gimbal 34.

The gimbal 34 may comprise one, two, or three axes, depending on system design and implementation requirements and, in some embodiments, can alter the LOS of the optical system 23 both in elevation and in azimuth.

The gimbal 34 includes an angle sensor 36 that is configured to determine a current axial orientation of the gimbal 34, and to output gimbal orientation information that identifies a current orientation of the gimbal 34. The optical system 23 includes a corrector lens 38 that is configured to reduce aberrations in EMR received from the window 12-1. The corrector lens 38 may have any desired shape, including, by way of non-limiting example, a circular shape or a rectangular shape. The corrector lens 38 may comprise any suitable material, including, by way of non-limiting example, infrared window materials, such as germanium, zinc sulfide, ALON®, spinel, sapphire, and the like. In some embodiments, the corrector lens 38 may optionally comprise the same material as the window 12-1.

The optical system 23 also includes a rotation mechanism 40 that is coupled to the corrector lens 38, and is configured to selectively rotate the corrector lens 38 about an optical centerline of the corrector lens 38 to maintain a Y-axis of the corrector lens 38 in a same plane as the window axis of symmetry of the window 12-1. By way of non-limiting example, the rotation mechanism 40 may comprise a servo-controlled mechanism, such as a direct drive, gear drive, or belt-driven servo-controlled mechanism. The servo-controlled mechanism may rotate the corrector lens 38, at least in part, based on signals from the angle sensor 36 that identify a current gimbal position.

In one embodiment, the corrector lens 38 may be positioned "on gimbal" and may move as the LOS of the optical system 23 is moved by the gimbal 34. In this embodiment, the rotation mechanism 40 is coupled to the gimbal 34. In another embodiment, the corrector lens 38 may be positioned downstream of the gimbal 34, and be positioned "off gimbal" at a location that is between the gimbal 34 and an EMR sensor 42. In this embodiment, the rotation mechanism 40 is independent of the gimbal 34 such that the rotation mechanism 40 is not mechanically coupled to the gimbal 34. However, in one or both embodiments, the rotation mechanism 40 may include a controller 43 that is communicatively coupled to the angle sensor 36 and configured to receive the gimbal orientation information from the angle sensor 36, based on the gimbal orientation information, determine a planar orientation of the Y-axis of the corrector lens 38 necessary to maintain the Y-axis of the corrector lens 38 in the same plane as the window axis of symmetry of the window 12-1, and cause the rotation mechanism 40 to rotate the corrector lens 38 to the planar orientation. In some embodiments, the corrector lens 38, whether on-gimbal or off-gimbal, is located at a pupil plane of the optical system 23. In some embodiments, the corrector lens 38 is the only corrective element in the optical system 23. The EMR sensor 42 may comprise a sensor that is sensitive to any desired wavelengths, such as, by way of non-limiting example, short-, mid- and/or long-wave infrared wavelengths, visible wavelengths, and/or ultraviolet wavelengths. In one embodiment, the EMR sensor 42 is a focal plane array.

Figure 5A:
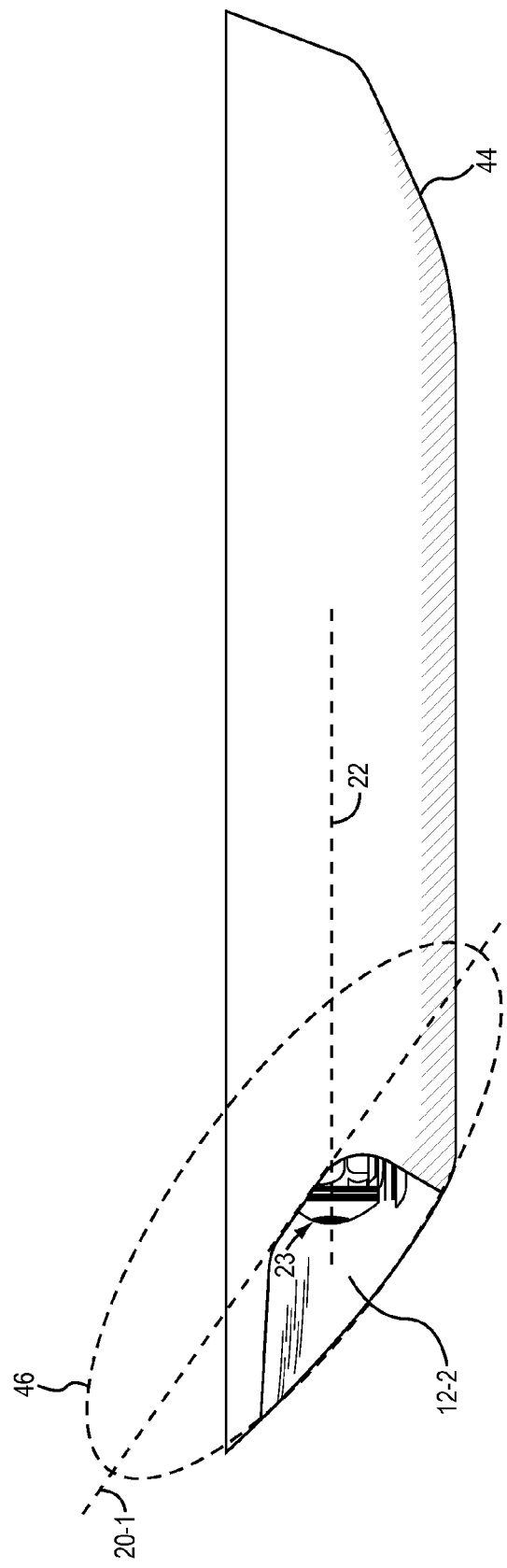
FIG. 5A is a side view of a portion of an airframe integrated with a conformal window according to another embodiment.

FIG. 5A is a side view of a portion 44 of an airframe integrated with a conformal window 12-2 according to another embodiment. Again, the portion 44 of the airframe may comprise, for example, a pod under a wing of an aircraft, the wing itself, or a fuselage. The conformal window 12-2 is a section of a symmetrical shape, in this example an ellipsoid 46. The ellipsoid 46 includes an axis of symmetry, which will be referred to herein as a window axis of symmetry 20-1. The conformal window 12-2 is symmetric about the window axis of symmetry 20-1.

The optical system 23 is positioned behind the window 12-2. The optical system 23 has a LOS that determines from where in the environment the optical system 23 is receiving EMR, as well as which location and orientation of the window 12-2 the EMR is passing through on a path to the sensor. The LOS illustrated in FIG. 5A is along the zero horizontal forward axis 22, in other words, straight ahead, but the LOS can change in elevation and/or in azimuth as desired. The LOS may be altered via the gimbal 34, which may comprise a 2- or 3-axis gimbal capable of moving the LOS in any desired direction, or at least in elevation and azimuth, as desired. Other than being a section of an ellipsoid rather than a cone, what was discussed above for the window 12-1 generally applies to the window 12-2 and optical system 23.

Figure 5B:
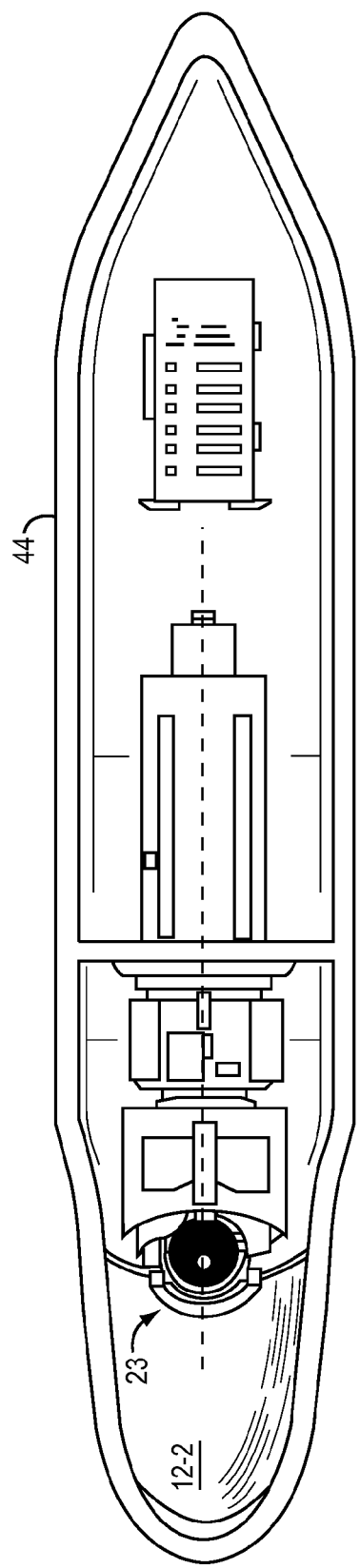
FIG. 5B is a plan view of the portion of the airframe illustrated in FIG. 5A.

FIG. 5B is a plan view of the portion 44 of the airframe illustrated in FIG. 5A.

Figure 6A:
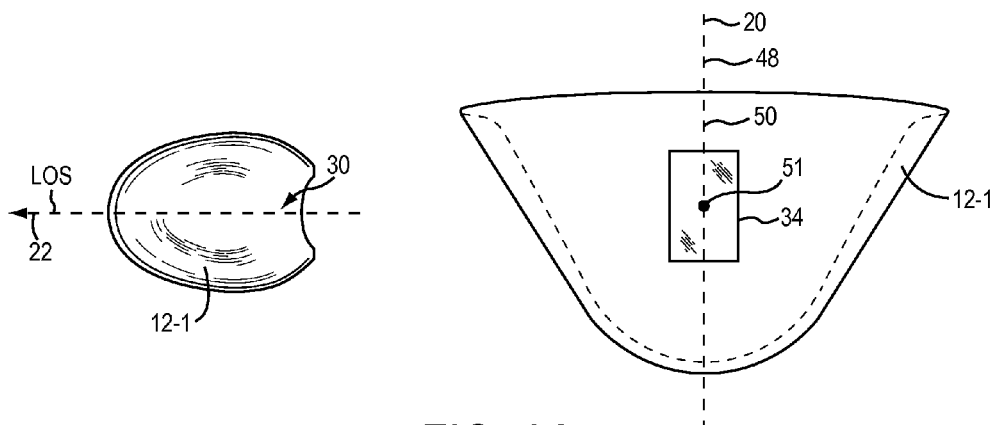
FIGS. 6A-6C are block diagrams illustrating a rotation of a corrector lens with respect to the conformal window illustrated in FIGS. 2A-2B, based on three different lines-of-sight of an optical system according to one embodiment.
Figure 6B:
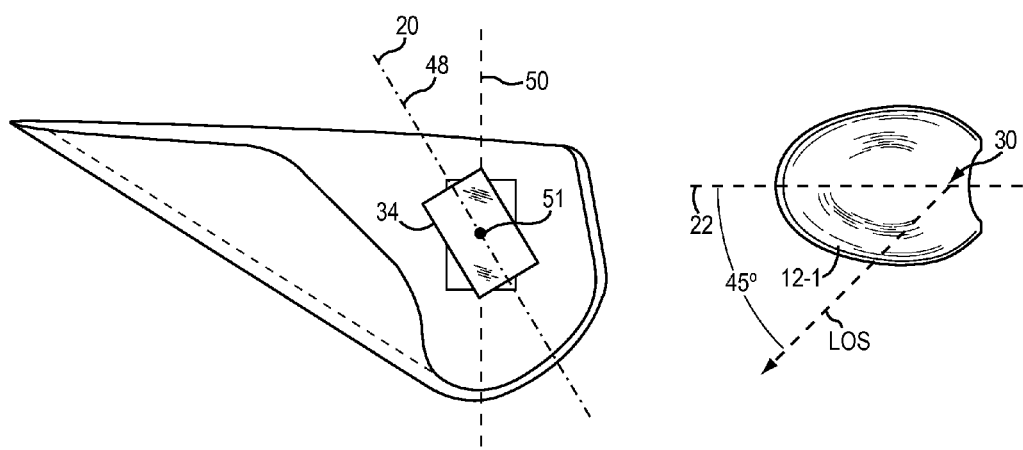
Figure 6C:
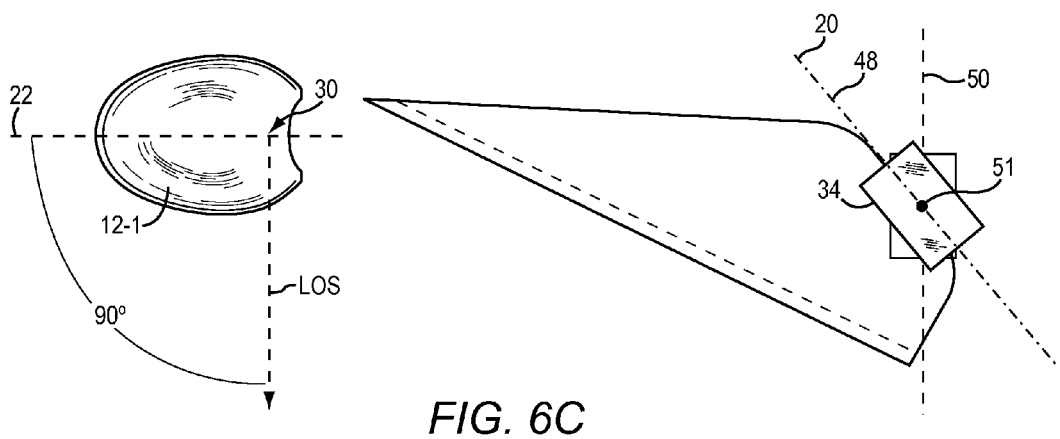

FIGS. 6A-6C are block diagrams illustrating a rotation of the corrector lens 38 with respect to the window 12-1 illustrated in FIGS. 2A-2B, based on three different LOSs of the optical system 23 according to one embodiment. Referring first to FIG. 6A, the view of the window 12-1 is from a perspective directly in front of the window 12-1. The LOS of the optical system 23 in this example is straight ahead, in other words, along the zero horizontal forward axis 22 of the vehicle illustrated in FIG. 2A. In this view, three axes are in the same plane, including the window axis of symmetry 20, a Y-axis 48 of the corrector lens 38, and a vertical gimbal axis 50 of the gimbal 34, about which the gimbal 34 moves. The Y-axis 48 of the corrector lens 38 is merely a line of reference with respect to the corrector lens 38 to illustrate the appropriate rotation about an optical axis 51 of the corrector lens 38 with respect to the other axes. In some embodiments, if the LOS of the optical system 23 were moved solely in elevation, which in this view would be up or down, then the Y-axis 48 of the corrector lens 38 need not be rotated.

FIG. 6B is a view of the window 12-1 from a perspective 45 degrees in azimuth from that in FIG. 6A. Thus, the LOS has shifted 45 degrees in azimuth from the LOS illustrated in FIG. 6A. The Y-axis 48 of the corrector lens 38 has been rotated about the optical axis 51 of the corrector lens 38 by the rotation mechanism 40 with respect to the window axis of symmetry 20 to maintain the Y-axis 48 in the same plane as the window axis of symmetry 20.

FIG. 6C is a view of the window 12-1 from a perspective 90 degrees in azimuth from that in FIG. 6A. Thus, the LOS has shifted 90 degrees in azimuth from the LOS illustrated in FIG. 6A. The Y-axis 48 of the corrector lens 38 has been rotated about the optical axis 51 of the corrector lens 38 additionally by the rotation mechanism 40 about the optical axis of the corrector lens 38 to maintain the Y-axis 48 in the same plane as the window axis of symmetry 20.

It should be understood that while necessarily for purposes of illustration FIGS. 6A-6C illustrate three discrete instances of time, the LOS of the optical system 23 may be moved continuously in azimuth or elevation during particular periods of time, and during such periods of time, the rotation mechanism 40 may be continuously rotating the corrector lens 38 to maintain the Y-axis 48 in the same plane as the window axis of symmetry 20.

In one embodiment, the rotation mechanism 40 is configured to rotate the corrector lens 38 about the optical axis of the corrector lens 38 to maintain the Y-axis 48 of the corrector lens 38 in the same plane as the window axis of symmetry 20 when the LOS scans in azimuth, and maintain the Y-axis 48 of the corrector lens 38 in the same plane as the window axis of symmetry 20 without rotation when the LOS scans in elevation.

The determination of the amount of rotation of the corrector lens 38 to maintain the Y-axis 48 in the same plane as the window axis of symmetry 20 may depend, at least in part, on the particular gimbal 34 being utilized. If a mirror of the gimbal 34 rotates about an axis that is parallel to the LOS, then the Y-axis 48 of the corrector lens 38 may have a 1:1 roll with gimbal angle, i.e. if the mirror of the gimbal 34 rotates about the axis that is parallel to the LOS by 45 degrees, then the Y-axis 48 of the corrector lens 38 would rotate at the window location by 45 degrees due to the gimbal 34. This rotation would be accounted for in determining the appropriate rotation of the corrector lens 38. If, alternatively, the mirror of the gimbal 34 rotates about an axis that is perpendicular to the LOS, such that the incident and reflected LOS remain co-planar as the mirror rotates, then the Y-axis 48 of the corrector lens does not necessarily rotate due to the mirror rotation. In one embodiment, the appropriate angle for rotation of the Y-axis 48 may be determined, at least in part, using rotation and reflection matrices, such as, for example, those described in "Military Standardization Handbook—Optical Design" (Mil-HDBK-141), which is hereby incorporated by reference herein in its entirety. The controller 43 may get angle measurements of the mirrors utilized in the gimbal 34 from the angle sensor 36, and solve for the appropriate angle to rotate the corrector lens 38 due to the gimbal mirror rotation. Generally, the corrector lens 38 may be rotated based on a sum of angles calculated from two algorithms:

1. a first algorithm derives the rotation angle required to maintain co-planarity of the Y-axis 48 of the corrector lens 38 at the window location of the LOS based on the orientation of the window axis of symmetry 20 of the window and the orientation of the Y-axis 48 of the corrector lens 38 at the window location; and 2. a second algorithm determines the orientation of the Y-axis 48 of the corrector lens 38 at the window location due to gimbal rotations. This may be determined utilizing rotation and reflection matrices that are well known to those skilled in the art for each gimbal axis.

Figure 7:
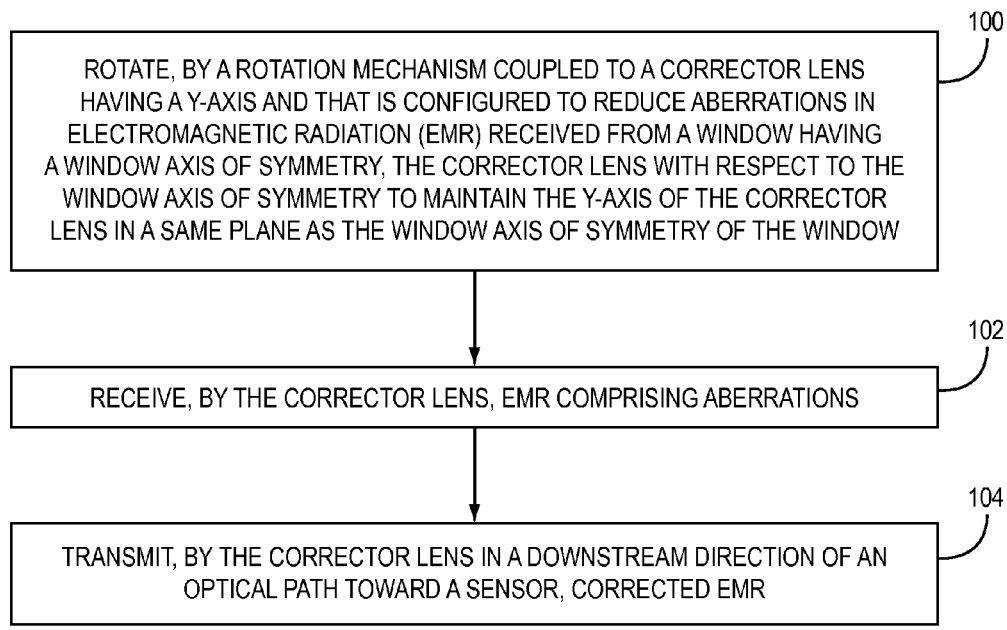
FIG. 7 is a flowchart of a method for reducing aberrations according to one embodiment.

FIG. 7 is a flowchart of a method for reducing aberrations according to one embodiment, and will be discussed in conjunction with FIG. 4. The rotation mechanism 40 rotates the corrector lens 38 about the optical axis of the corrector lens 38 to maintain the Y-axis 48 of the corrector lens 38 in a same plane as the window axis of symmetry 20 of the window 12-1 (block 100). The corrector lens 38 receives EMR comprising aberrations via the window 12-1 (block 102). The corrector lens 38 transmits corrected EMR in a downstream direction of an optical path toward the EMR sensor 42.

The embodiments, among other advantages, provide an optical system that corrects or reduces aberrations caused by a conformal window using a single corrective element, reducing cost, size requirements, and complexity. Those skilled in the art will recognize improvements and modifications to the preferred embodiments of the disclosure. All such improvements and modifications are considered within the scope of the concepts disclosed herein and the claims that follow.

What is claimed is:

1. An optical system, comprising:
a corrector lens configured to reduce aberrations in electromagnetic radiation (EMR) received from a window having a window axis of symmetry, the corrector lens having a Y-axis; and
a rotation mechanism coupled to the corrector lens, the rotation mechanism configured to selectively rotate the corrector lens about an optical axis of the corrector lens different from the window axis of symmetry to maintain the Y-axis of the corrector lens in a same plane as the window axis of symmetry.

2. The optical system of claim 1, wherein the optical system has a line-of-sight (LOS), and wherein the rotation mechanism is further configured to rotate the corrector lens about the optical axis of the corrector lens based on a window location and a window orientation associated with a current LOS of the optical system.

3. The optical system of claim 1, wherein the rotation mechanism is further configured to rotate the corrector lens to a first angular position when the LOS intersects the window at a first window location, and to a second angular position when the LOS intersects the window at a second window location.

4. The optical system of claim 1, further comprising the window, wherein the window is a section of a cone.

5. The optical system of claim 1, further comprising the window, wherein the window is a section of an ellipsoid.

6. The optical system of claim 1, further comprising a gimbal, and wherein the rotation mechanism is coupled to the gimbal.

7. The optical system of claim 1, further comprising a gimbal, and wherein the rotation mechanism is independent of the gimbal.

8. The optical system of claim 1, wherein the corrector lens comprises a corrective element, and the corrector lens is the only corrective element in the optical system.

9. The optical system of claim 1, wherein the optical system comprises a pupil plane, and wherein the corrector lens is positioned at the pupil plane.

10. The optical system of claim 1, wherein the optical system has a line-of-sight (LOS) that is movable in azimuth and in elevation, and wherein the rotation mechanism is further configured to rotate the corrector lens about the optical axis of the corrector lens to maintain the Y-axis in the same plane as the window axis of symmetry when the LOS scans in azimuth, and wherein the Y-axis of the corrector lens is maintained in the same plane as the window axis of symmetry without rotation when the LOS scans in elevation.

11. The optical system of claim 1, further comprising a sensor, and wherein the corrective lens rotates with respect to the sensor.

12. The optical system of claim 1, wherein the corrector lens corrects for astigmatism along an axis that is normal to the window axis of symmetry.

13. The optical system of claim 1, wherein the corrector lens corrects for trefoil along an axis that is parallel to the window axis of symmetry.

14. The optical system of claim 1, further comprising:
a gimbal comprising:
a sensor configured to output gimbal orientation information that identifies a current orientation of the gimbal; and
wherein the rotation mechanism comprises a controller, the controller communicatively coupled to the gimbal and configured to:
receive the gimbal orientation information;
based on the gimbal orientation information, determine a planar orientation of the Y-axis of the corrector lens necessary to maintain the Y-axis of the corrector lens in the same plane as the window axis of symmetry; and
cause the rotation mechanism to rotate the corrector lens to the planar orientation.

15. An aircraft comprising:
an airframe including a non-spherical aerodynamic surface;
a conformal window that conforms to the non-spherical aerodynamic surface; and
an optical system positioned within the airframe and configured to receive electromagnetic radiation (EMR) through the conformal window, comprising:
a corrector lens configured to reduce aberrations in the EMR received through the conformal window, the conformal window having a window axis of symmetry and the corrector lens having a Y-axis; and
a rotation mechanism coupled to the corrector lens, the rotation mechanism configured to selectively rotate the corrector lens about an optical axis of the corrector lens different from the window axis of symmetry to maintain the Y-axis of the corrector lens in a same plane as the window axis of symmetry.

16. The aircraft of claim 15, wherein the aircraft comprises one of a helicopter, an airplane, and an unmanned aerial vehicle.

17. The aircraft of claim 15, wherein the optical system has a line-of-sight (LOS), and wherein the rotation mechanism is further configured to rotate the corrector lens about the optical axis of the corrector lens based on a window location associated with a current LOS of the optical system.

* * * * *